US007952307B2

(12) United States Patent
Wang et al.

(10) Patent No.: US 7,952,307 B2

(45) Date of Patent: May 31, 2011

(54) CONTAINER WITH BUFFERED COVER

(76) Inventors: Xin Wang, Fujian (CN); Jiangqun Chen, Fujian (CN)

( * ) Notice: Subject to any disclaimer, the term of this patent is extended or adjusted under 35 U.S.C. 154(b) by 0 days.

(21) Appl. No.: 12/583,947

(22) Filed: Aug. 27, 2009

(65) Prior Publication Data

US 2009/0321445 A1 Dec. 31, 2009

Related U.S. Application Data

(63) Continuation of application No. 11/578,203, filed on Oct. 11, 2006, now Pat. No. 7,598,693.

(30) Foreign Application Priority Data

Aug. 16, 2005 (WO) ................ PCT/CN2005/001274

(51) Int. Cl.
*H02P 1/00* (2006.01)

(52) U.S. Cl. ........ 318/266; 318/466; 318/468; 318/560; 53/528; 53/567; 53/576

(58) Field of Classification Search .................. 318/266, 318/466, 468, 560; 53/526, 567, 576
See application file for complete search history.

(56) References Cited

U.S. PATENT DOCUMENTS 6,612,099 B2 * 9/2003 Stravitz ........................... 53/526
6,752,476 B2 * 6/2004 Lin ............................... 312/290
6,804,930 B2 * 10/2004 Stravitz ........................... 53/211
7,034,485 B2 * 4/2006 Kuan et al. .................... 318/466
7,146,785 B2 * 12/2006 Stravitz ........................... 53/567
7,316,100 B2 * 1/2008 Stravitz et al. .................. 53/211
7,423,400 B2 * 9/2008 Chinsen et al. ............... 318/466
7,434,377 B2 * 10/2008 Stravitz et al. .................. 53/567
7,503,152 B2 * 3/2009 Stravitz et al. .................. 53/211
7,503,159 B2 * 3/2009 Stravitz et al. .................. 53/567
7,586,280 B2 * 9/2009 Warren et al. ................. 318/466
7,592,762 B2 * 9/2009 Warren et al. ................. 318/266
7,617,659 B2 * 11/2009 Stravitz et al. .................. 53/567
7,688,013 B2 * 3/2010 Frommer et al. ............. 318/466
7,694,493 B2 * 4/2010 Stravitz et al. .................. 53/370
7,708,188 B2 * 5/2010 Stravitz et al. ............... 232/43.2
7,712,285 B2 * 5/2010 Stravitz et al. .................... 53/77
2002/0162304 A1 * 11/2002 Stravitz ........................... 53/526
2002/0190615 A1 * 12/2002 Lin ............................... 312/297
2003/0208995 A1 * 11/2003 Stravitz ........................... 53/576
2004/0083681 A1 * 5/2004 Stravitz ........................ 53/138.1
2005/0028491 A1 * 2/2005 Stravitz ........................... 53/470
2005/0183400 A1 * 8/2005 Stravitz et al. .................. 53/567
2005/0183401 A1 * 8/2005 Stravitz et al. .................. 53/567
2005/0188661 A1 * 9/2005 Stravitz et al. .................. 53/567
2005/0193691 A1 * 9/2005 Stravitz et al. .................. 53/567
(Continued)

Primary Examiner — Paul Ip
(74) *Attorney, Agent, or Firm* — Raymond Y. Chan; David and Raymond Patent Firm

(57) ABSTRACT

A container, adapted to be opened/closed automatically by induction actuated, includes a container body, cover, motor and actuating device, wherein the motor is connected to the driven element of the cover through the actuating device. The dustbin includes a sensing and controlling device of the stroke of the cover, wherein a cover stroke perception and a shut off circuit, the cover stroke perception is connected with the shut off circuit, and the shut off circuit is connected with the motor, the shut off circuit receives the activating signal from the cover stroke perception and then controls the motor to actuate correspondingly, the cover's stroke inducted by the trigger; point of the cover stroke perception is less than the whole stroke during the closing of the cover. The noise of the crash between the cover and the container body is low, and closing of the cover is rapid and spiffy.

11 Claims, 4 Drawing Sheets

U.S. PATENT DOCUMENTS

2005/0193692 A1* 9/2005 Stravitz et al. .................. 53/567
2005/0237188 A1* 10/2005 Tani .............................. 340/541
2005/0274093 A1* 12/2005 Stravitz et al. .................. 53/567
2006/0021301 A1* 2/2006 Stravitz et al. .................. 53/576
2006/0130438 A1* 6/2006 Stravitz et al. .................. 53/567
2006/0130439 A1* 6/2006 Stravitz et al. .................. 53/567
2006/0196874 A1* 9/2006 Yang ............................. 220/211
2007/0175182 A1* 8/2007 Stravitz et al. .................. 53/576
2007/0180798 A1* 8/2007 Stravitz et al. .................. 53/576
2007/0209846 A1* 9/2007 Wilson ......................... 180/65.1
2007/0246465 A1* 10/2007 Stravitz et al. ................ 220/200
2007/0266637 A1* 11/2007 McGowan ...................... 49/349
2009/0057317 A1* 3/2009 Wang et al. .............. 220/495.06

* cited by examiner

CONTAINER WITH BUFFERED COVER

CROSS REFERENCE TO RELATED APPLICATION

This is a Continuation application that claims the benefit of priority under 35 U.S.C. §119 to a non-provisional application having an application Ser. No. 11/578,203 and a filing date of Oct. 11, 2006 now U.S. Pat. No. 7,598,693.

BACKGROUND OF THE PRESENT INVENTION

1. Field of Invention

The present invention relates to a container, and more particularly to a container cover for a container, wherein the container cover incorporates with an induction-actuated arrangement to open and close the cover panel of the container cover in a hydraulic manner.

2. Description of Related Arts

In prior art, the induction-actuated container makes big noise when closing. The noise comes from collision between the container cover and the container body. The cover turns 90 degrees from open state to close state and accelerates gradually; coming to the utmost at the moment is closes, causing great noise. It is a hassle for a user regarding the noise especially at nighttime.

SUMMARY OF THE PRESENT INVENTION

A main object of the present invention is to provide a container cover incorporating with an induction-actuated arrangement to open and close the cover panel of the container cover in a hydraulic manner so as to moderate the noise generated therefrom. In other words, the cover panel is actuated to open and close in a decelerating manner without using any hydraulic device.

Accordingly, in order to accomplish the above object, the present invention provides a container, such as a trash container or a dustbin, comprising a container body, a container cover having a cover panel, an electric motor and a transmission device. The motor is transmissively connected with the driven member of the container cover through the transmission device. The container further comprises a route sensor, controller, a route feeler, and a cut-off circuit. The route sensor is communicatively connected to a controlling end of the cut-off circuit, wherein the cut-off circuit is electrically connected to the electric motor. The cut-off circuit controls the output of the electric motor after receiving a signal from the route feeler, which can detect a route shorter than a total closing route. In other words, the cut-off circuit receives the actuating signal at a trigger point during the cover panel is in a closing process that a route of the cover panel is smaller than a total route of the cover panel between an open state and a close state. Therefore, the trigger point is preset between the open state and the close state of the cover panel.

Accordingly, before the cover panel closes completely, the route feeler sends a signal to the cut-off circuit to stop the output of the electric motor immediately. At the same when the electric motor is stop to transmit the power towards the cover panel, the cover panel will keep moving by inertia. Therefore, the cover panel will be decelerated by itself before contacting with the container body. In other words, the cover panel contacts with the container body with lower speed and relatively small kinetic energy so as to minimize the noise generated by the contact between the cover panel and the container body.

The object of the present invention could also be realized through the following aspects:

The route sensor and controller also comprises a short-circuit circuitry having a controlling end connecting to the route feeler and an outputting end connecting to two terminals of the electric motor.

Accordingly, when the cut-off circuit turns off the electric motor, the short-circuit circuitry generates an input to the terminals of the electric motor to form a loop to create a braking effect. In other words, when the cover panel closes by inertia, the transmission device transmits the rotational power from the cover panel back to the electric motor. According to the electromagnetic principle, the DC electric motor becomes a dynamo that the current passes through the induction coil of the electric motor. Therefore, the cover panel will be decelerated by the electric motor while closing to minimize the noise from the cover panel with respect to the container body.

The route sensor and controller also comprises a reversing circuit, which has a controlling end connecting to the route feeler, electrically coupling between the power source and the electric motor.

Accordingly, when the cut-off circuit stops the output of the electric motor, the route feeler activates the reversing circuit such that the electric motor with the reversed current is actuated to output the opposed rotational power, i.e. the opening direction of the cover panel, to enhance the deceleration of the cover panel at the close state.

The route sensor and controller also comprises a delay circuit incorporating one of the above mentioned short-circuit circuitry and the reversing circuit. The controlling end of short-circuit circuitry or the reversing circuit is electrically coupled with the route feeler and connected to the electric motor. The delay circuit and the short-circuit circuitry (or the reversing circuit) are also connected to the cut-off circuit.

Accordingly, the delay circuit controllably activates the short-circuit circuitry (or the reversing circuit) for a relatively short time. The short-circuit circuitry (or the reversing circuit) is deactivated when the cover panel is not closed completely, i.e. at the closing process. The cut-off circuit is activated to actuate the electric motor to drive the cover panel until the cover panel is completely closed. Since the cover panel is stopped during the closing process, the cover panel operates two sequent closing actions to decelerate the closing speed of the cover panel. In other words, the cover panel moves at shorter distance to the close state after the cover panel is temporarily stopped in comparison with the cover panel moves from the open state to the close state. Therefore, the cover panel will be decelerated while closing to minimize the noise from the cover panel and to ensure the cover panel being completely closed.

The above mentioned cut-off circuit, the short-circuit circuitry or the reversing circuit consists of four triodes Q2, Q3, Q4, Q5 and diodes D5, D6, D7, D8 to form a forward/backward actuating circuit.

The route feeler can be a position sensor directly detecting the traveling displacement of the cover panel, i.e. route of the cover panel between the open state and the close state. Alternatively, the route feeler can be a time delay switch actuating the cover panel at a predetermined time after an actuating signal is detected.

The route sensor can be a route feeler comprising of a route switch and a cam, a magnetism-electric route sensor comprising a magnetic-controlled switch and a magnet, or a photo sensor comprising a light-controlled switch.

The route sensor can be an individual sampling circuit or a combination of the sampling circuit and a computing device (counter device) if necessary.

The movable components, such as the cam, the magnet, etc, can be mounted in the transmission device or in the container cover.

When the photo sensor is used, a norm circuit (reference circuit 5) and a comparing circuit are incorporated with the route cover and the controller. The comparing circuit comprises the sampling signal from the computing device with the norm value of the norm circuit. When the value is the same or bigger than the norm valve, the comparing circuit is triggered that the cut-off circuit is controlled to be activated.

The above mentioned computing device, the norm circuit, the comparing circuit and the delay circuit can be integrated in a IC3, mode CF745 chip.

The detailed description of the route sensed by the actuating point of the route feeler is shown below.

The cover route sensed by the trigger point of route sensor is longer than half of the total route of closing. The best should be 90% to 70% of the total route.

When the cover panel continuously closes by its inertia, the upper limit of the cover route sensed by the actuating point of the route feeler is preferably preset, i.e. 90% or approximately 90% of the route. When the cover brakes or beings the second closing motion, a lower limit is preferably preset, i.e. 70% or approximately 70% of the route. The brake time is about 0.2 second and the second closing time is from 0.1 second to 0.3 second.

As a result, in comparison with the conventional container cover, the present invention provides a container cover adapted to smoothly and rapidly close and to minimize the noise during closing movement.

Figure 1:
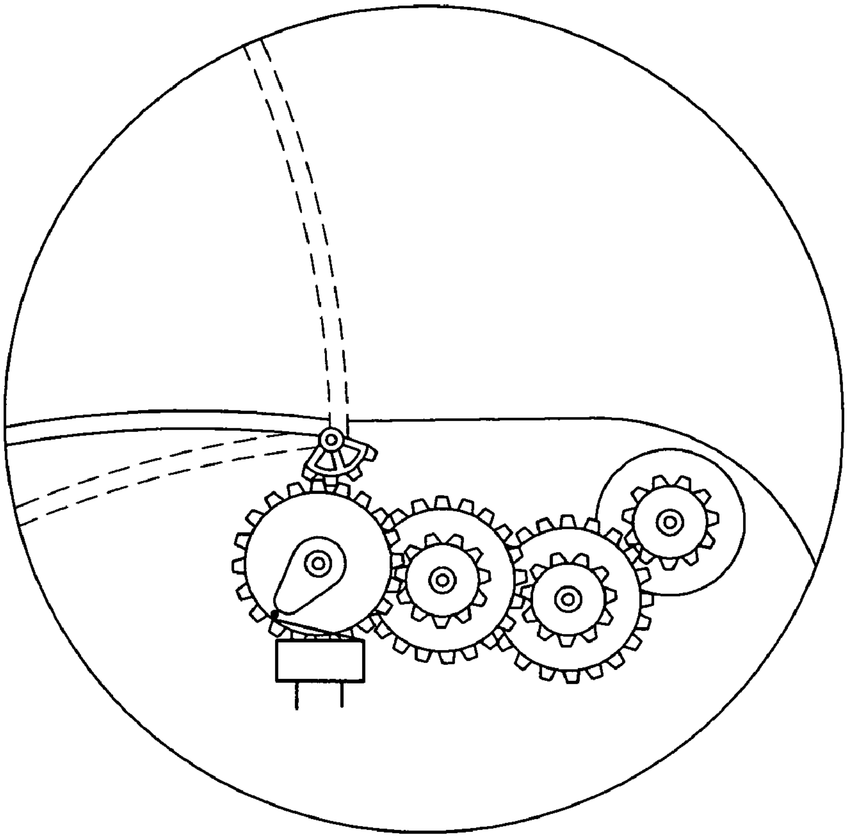
FIG. 1 is a schematic diagram showing configuration of the delay-closing container according to a first embodiment of the present invention.

Accordingly, the reference characters of the present invention are: 1-route feeler, 11-magnetic control switch, 12-computing device, 2-cut-off circuit, 3-short circuit circuitry, 4-electric motor, 6-comparing circuit, 7-delay circuit.

DETAILED DESCRIPTION OF THE PREFERRED EMBODIMENT

Figure 2:
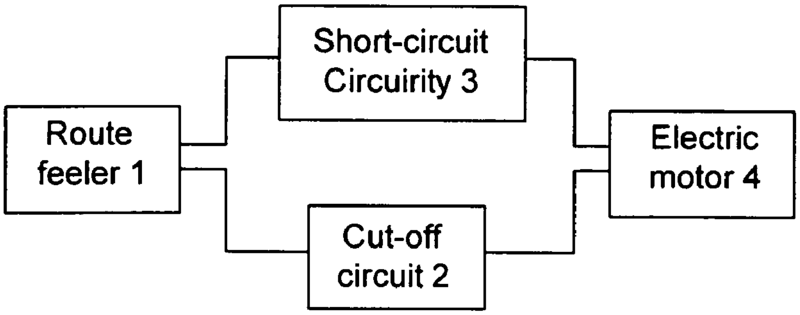
FIG. 2 is a block diagram according to the above first preferred embodiment of the present invention.

Referring to FIGS. 1 and 2 of the drawings, a container according to the first preferred embodiment of the present invention comprises a container body, a container cover having a cover panel, an electric motor, and a transmission device. The electric motor is transmissively connected with a driven member of the cover panel through the transmission device. The container cover further comprises a route feeler 1 electrically connected to a controlled end of a cut-off circuit 2, wherein the cut-off circuit 2 is electrically connected to the electric motor 4. The cut-off circuit 2 receives a signal from the route feeler 1 to activate the electric motor 4, wherein the route movement of the electric motor 4 at a trigger point is shorter than the route of the cover panel, i.e. between the open state of the cover panel and the close state thereof. Accordingly, the route movement of the electric motor 4 reaching at the trigger point is approximately 70% of the route of the cover panel. The route sensor and controller further comprises a short-circuit circuitry 3, wherein the controlling end of the short-circuit circuitry 3 is electrically connected to the route feeler 1 and is electrically coupled between two terminals of the electric motor 4. The route sensor comprises a route switch and a cam. For closing the cover panel, the DC electric motor 4 is powered with backward direct current, i.e. the opposite direction of the current of opening the cover panel. Then, the electric motor 4 drives the cover panel to its close state through a decelerating gear unit of the transmission device. When the cover panel moves at a position close to its close state, for example, the cover panel has been moved 80° from the total route of 90°, the cam of the route feeler 1 is triggered by the route switch to send a signal to the cut-off circuit 2 and the short-circuit circuitry 3 so as to deactivate the electric motor 3. Therefore, the electric motor 3 is stopped to generate the output to the cover panel. Since the cover panel is not completely closed, the cover panel will keep moving to its close state by inertia. It is worth to mention that when the cover panel moves by its inertia, the power from the cover panel transmits to the electric motor through the transmission device such that the electric motor becomes a dynamo. Since the current passes through the coil in the electric motor after the electric motor is cut off, the electric motor generates a braking output to stop the movement of the cover panel in a relatively short period of time. Such braking effect is the same as braking a car.

Figure 3:
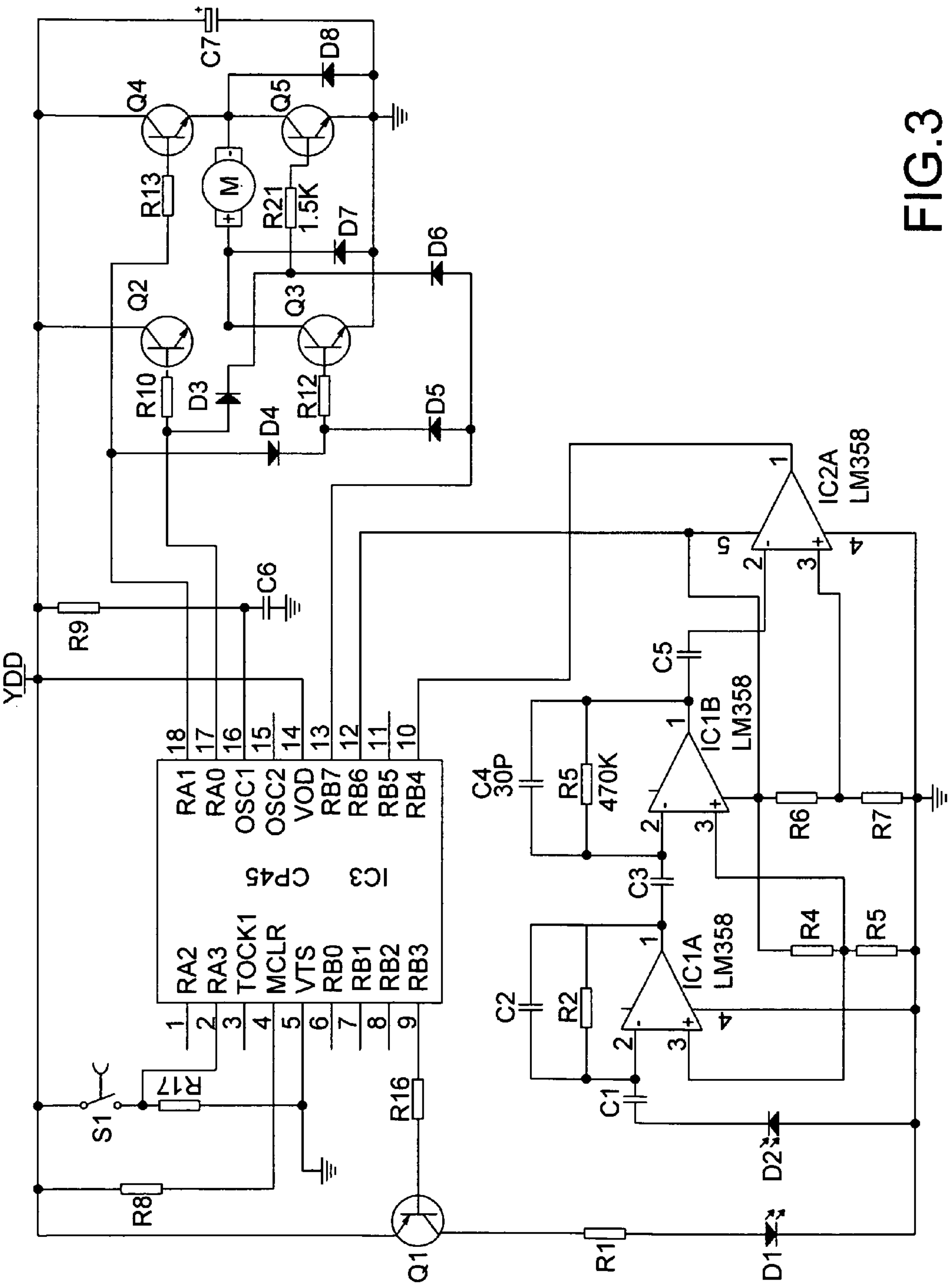
FIG. 3 is a circuit diagram according to the above first preferred embodiment of the present invention.

As shown in FIG. 3, when closing the cover panel, output of IC3 is in higher level, RA0 and Rb7 is in lower level. Q3 and Q4 in the driving circuit are connected while Q2 and Q5 are cut off. The electric motor M generates an opposed rotational output under an opposed voltage to drive the gear unit, the cam and the cover panel to rotate. When the cover panel moves at a position close to its close state, i.e. moving 80° from the total route of 90°, the cam 3 contacts the route switch. After the route switch is triggered, the output terminal RA3 of IC3 reaches to a higher level from its lower level. Through the process of IC3, the outputs of RA1 and RA0 become lower level and deactivate the triodes Q2 and Q3. RB7 outputs a higher energy level that triodes Q3 and Q5 are connected through D5, R12 and D6, R21 respectively. After Q3 and Q5 are connected with D8 and D7 respectively, the two terminals of the electric motor form a positive and negative loops as a short circuit of the electric motor. After the motor is stopped generating the output, the cover will continuously move to its close state by inertia through the 10° of route. At the same time, the electric motor will generate the braking output to the cover panel to slow down the cover panel as a braking effect. Therefore, the cover panel will completely close with lower speed to minimize the noise from the movement of the cover panel with respect to the container body. It is worth to mention that all other necessary components of the container, which are not mentioned above, are the same as the conventional container.

Figure 4:
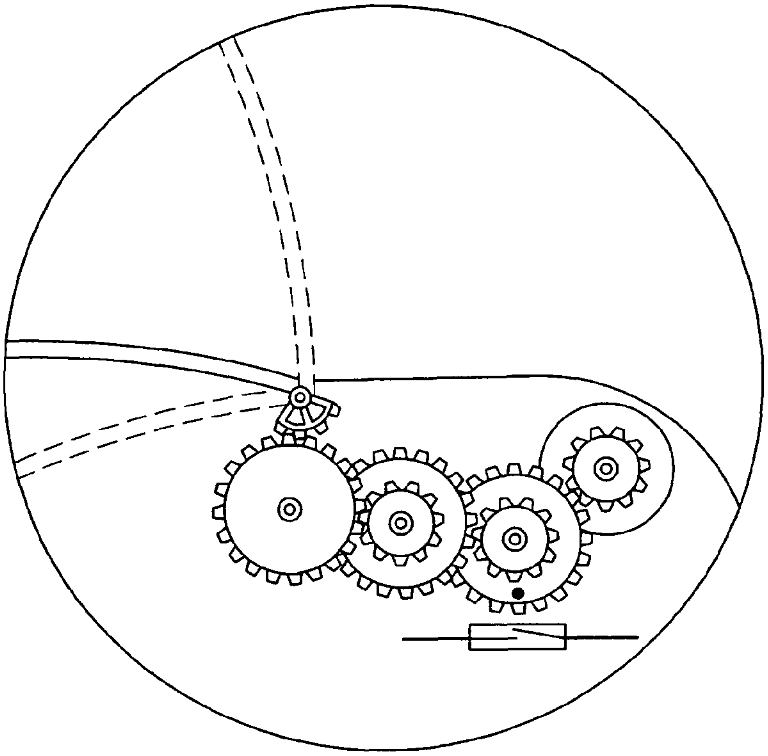
FIG. 4 is a schematic diagram showing the configuration of the delay-closing container according to a second embodiment of the present invention.
Figure 5:
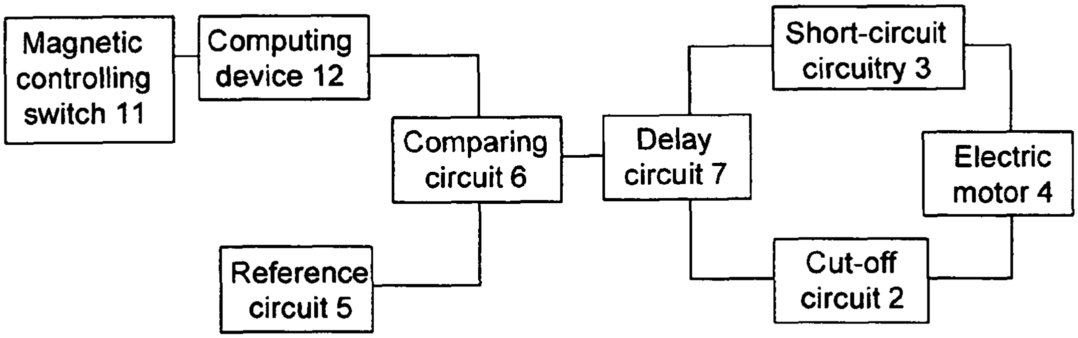
FIG. 5 is a block diagram according to the above second preferred embodiment of the present invention.

As shown in FIGS. 4 and 5, the container according to a second embodiment is illustrated. The delay-closing container comprises a container body, a container cover having a cover panel, and a transmission device. The electric motor is transmissively connected with a driven member of the cover panel through the transmission device. The container cover further comprises a route feeler 1 electrically connected to a controlled end of a cut-off circuit 2, wherein the cut-off circuit 2 is electrically connected to the electric motor 4. The cut-off circuit 2 receives a signal from the route feeler 1 to activate the electric motor 4, wherein the route movement of the electric motor 4 is shorter than the route of the cover panel, i.e. between the open state of the cover panel and the close state thereof. Accordingly, the route movement of the electric motor 4 is approximately 80% of the route of the cover panel. The route sensor and controller further comprises a delay circuit 7 and a short-circuit circuitry 3, wherein the controlling end of the short-circuit circuitry 3 is electrically connected to the route feeler 1 and is electrically coupled between two terminals of the electric motor 4. The delay circuit 7 is electrically connected to the short-circuit circuitry 3 and to the cut-off circuit 2. The route sensor is a magnetic-electricity sensor comprising a magnetic controlling switch 11 and a magnet. For closing the cover panel, the DC electric motor 4 is powered with backward direct current, i.e. the opposite direction of the current of opening the cover panel. After the cover panel moves 80% of the total route, the delay circuit 7 controllably activates the short-circuit circuitry 3 for a relatively short time, wherein the short-circuit circuitry 3 is deactivated and the cut-off circuit 3 is activated to re-power the electric motor. In other words, the cut-off circuit 3 is activated to actuate the electric motor to drive the cover panel until the cover panel is completely closed. Since the cover panel is stopped during the closing process, the cover panel operates two sequent closing actions to decelerate the closing speed of the cover panel. Preferably, the cover panel completely closes approximately 0.1 to 0.3 second after the cover panel is stopped during the closing process. Therefore, the cover panel moves at shorter distance to the close state after the cover panel is temporarily stopped in comparison with the cover panel moves from the open state to the close state. As a result, the cover panel will be decelerated while closing to minimize the noise from the cover panel and to ensure the cover panel being completely closed.

Figure 6:
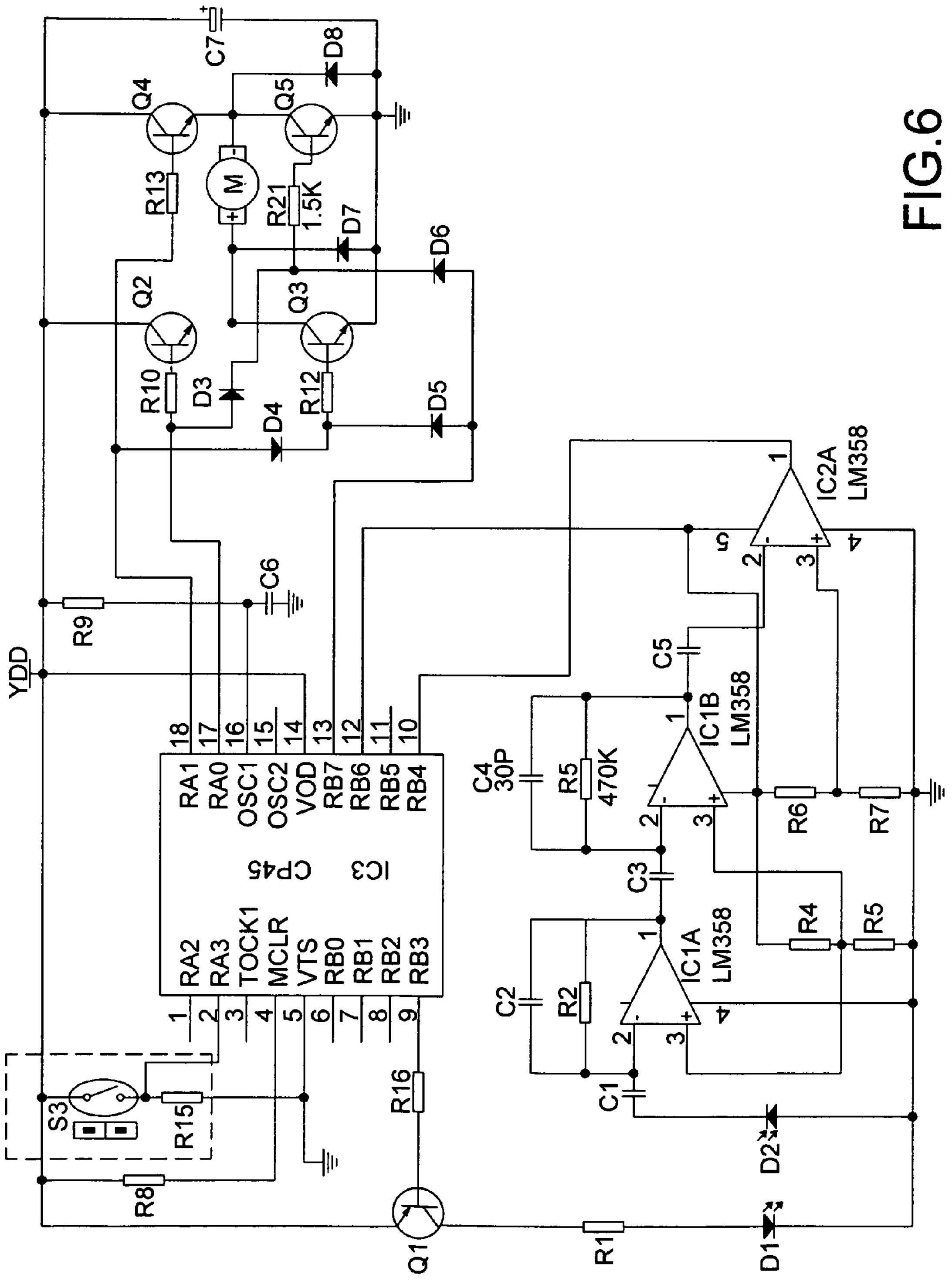
FIG. 6 is a circuit diagram according to the above second preferred embodiment of the present invention.

As shown in FIG. 6, when the cover panel closes, output RA1 of IC3 is in higher level while outputs of RA0 and RB7 are in lower level. Q3 and Q4 of the driving circuit are connected while Q2 and Q5 thereof are cut off. An opposite voltage is applied to the electric motor M to generate an opposed rotational output so as to drive the cover panel to turn through the gear unit and cam. When the cover panel flips at 70 degrees at a counterclockwise direction, the gear unit revolves 8 revolutions. Eight impulse signals from the magnetic-controlling switch are sent to the computing device of IC3 for processing and comparing with a norm value. When the value is the same or higher than the norm value, IC3 controls outputs of RA1 and RA0 to be in lower level and output of RB7 in higher level wherein the process of IC3 takes about 0.1 to 0.3 second. RB7 outputs a higher energy level that triodes Q3 and Q5 are connected through D5, R12 and D6, R21 respectively. After Q3 and Q5 are connected with D8 and D7 respectively, the two terminals of the electric motor form a positive and negative loops as a short circuit of the electric motor. After the motor is stopped generating the output, the cover will continuously move to its close state by inertia through the 10° of route. At the same time, the electric motor will generate the braking output to the cover panel to slow down the cover panel as a braking effect. Output of IC3 turns RA1 to be in higher level, RA0 and RA7 to be in lower level once again. Then, Q3 and Q4 of the driving circuit are connected while Q2 and Q5 thereof are cut off. An opposite voltage is applied to the electric motor M to generate an opposed rotational output so as to drive the cover panel to turn through the gear unit and cam. As a result, the cover panel will move at the route of 10° to completely finish the total route thereof to its close state. It is worth to mention that all other necessary components of the container, which are not mentioned above, are the same as the conventional container.

What is claimed is:

1. A container, comprising:

a container body; and a container cover, which comprises:

a cover panel moving between an open state and a close state;

an electric motor at said container cover for generating an output to said cover panel through a transmission device to move said cover panel between said open state and said close state; and a route sensor and controller which comprises a route feeler and a cut-off circuit electrically linked between said route feeler and said electric motor, wherein before said cover panel closes completely, said route feeler sends an actuating signal to said cut-off circuit so as to deactivate said electric motor for stop generating said output to said cover panel, in such a manner that said cover panel is kept moving by inertia and is decelerated by itself in a hydraulic-like manner until said cover panel is completed closed, so as to minimize noise generated by a contact between said cover and said container body.

2. The container, as recited in claim 1, wherein said route sensor and controller further comprises a short-circuit circuitry having a controlling end electrically connecting to said route feeler and an output end electrically connecting to said electric motor, wherein when said electric motor is deactivated by said cut-off circuit, said short-circuit circuitry generates an input to said electric motor to form a loop to create a braking effect of said cover panel, such that when said cover panel is closing by inertia, said transmission device transmits said output back to said electric motor from said cover panel.

3. The container, as recited in claim 2, wherein said route sensor and controller further comprises a delay circuit electrically linking with said cut-off circuit and said short-circuit circuitry to control an activation of said cut-off circuit and said short-circuit circuitry during a closing process of said cover panel, wherein before said cover panel is close completely, said short-circuit circuitry is deactivated and said cut-off circuit is activated to generate two sequent closing actions to decelerate a closing speed of said cover panel so as to minimize the noise from said cover panel and to ensure said cover panel being completely closed.

4. The container, as recited in claim 1, wherein said route sensor and controller further comprises a reversing circuit electrically connecting to said route feeler, wherein when said electric motor is deactivated by said cut-off circuit, said route feeler activates said reversing circuit to operate said electric motor with a reversed current, such that said electric motor generates an opposed output to said cover panel for enhancing a deceleration of said cover panel until said cover panel is completely closed.

5. The container, as recited in claim 4, wherein said route sensor and controller further comprises a delay circuit electrically linking with said cut-off circuit and said reversing circuit to control an activation of said cut-off circuit and said reversing circuit during a closing process of said cover panel, wherein before said cover panel is close completely, said reversing circuit is deactivated and said cut-off circuit is activated to generate two sequent closing actions to decelerate a closing speed of said cover panel so as to minimize the noise from said cover panel and to ensure said cover panel being completely closed.

6. The container, as recited in claim 3, wherein said route feeler is a position sensor detecting a closing route of said cover panel to send said actuating signal to said cut-off circuit.

7. The container, as recited in claim 5, wherein said route feeler is a position sensor detecting a closing route of said cover panel in order to send said actuating signal to said cut-off circuit.

8. The container, as recited in claim 3, wherein said route feeler is a time delay switch detecting a closing time of said cover panel in order to send said actuating signal to said cut-off circuit.

9. The container, as recited in claim 5, wherein said route feeler is a time delay switch detecting a closing time of said cover panel in order to send said actuating signal to said cut-off circuit.

10. The container, as recited in claim 3, wherein said cover panel is decelerated when said cover panel completes between 70% and 90% of a closing route of said cover panel.

11. The container, as recited in claim 5, wherein said cover panel is decelerated when said cover panel completes between 70% and 90% of a closing route of said cover panel.

* * * * *